United States Patent
Lee et al.

(10) Patent No.: US 8,291,491 B2
(45) Date of Patent: Oct. 16, 2012

(54) PASSWORD SYSTEM, METHOD OF GENERATING A PASSWORD, AND METHOD OF CHECKING A PASSWORD

(75) Inventors: Hyun-woong Lee, Suwon-si (KR); Mi-jung Noh, Yongin-si (KR); Hong-mook Choi, Bucheon-si (KR); Xingguang Feng, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 717 days.

(21) Appl. No.: 12/398,359

(22) Filed: Mar. 5, 2009

(65) Prior Publication Data
US 2009/0228977 A1    Sep. 10, 2009

(30) Foreign Application Priority Data
Mar. 5, 2008    (KR) .................. 10-2008-0020581

(51) Int. Cl.
*G06F 7/04* (2006.01)
(52) U.S. Cl. ............. 726/18; 713/183; 713/184; 380/44
(58) Field of Classification Search .................. 380/25, 380/44; 713/183
See application file for complete search history.

(56) References Cited

U.S. PATENT DOCUMENTS

| | | | |
|---|---|---|---|
| 4,800,590 A * | 1/1989 | Vaughan | 713/184 |
| 6,389,539 B1 | 5/2002 | Hamilton, II et al. | |
| 7,100,197 B2 | 8/2006 | Rail | |
| 2004/0044896 A1 * | 3/2004 | Kelley et al. | 713/183 |
| 2008/0031446 A1 * | 2/2008 | Suga | 380/44 |

FOREIGN PATENT DOCUMENTS

| | | |
|---|---|---|
| JP | 11-068733 | 3/1999 |
| KR | 2002-0009783 | 2/2002 |

* cited by examiner

*Primary Examiner* — Nathan Flynn
*Assistant Examiner* — Phuoc Tran
(74) *Attorney, Agent, or Firm* — Volentine & Whitt, PLLC

(57) ABSTRACT

A password system includes a user interface, a password generating unit, and a password checking unit. The password generating unit generates a password including multiple frames, generates an integrity check code associated with the generated password, and scrambles the generated password and provides the scrambled password to the user interface. The password checking unit stores the integrity check code, frame number information and scramble information which are provided from the password generating unit, descrambles a scrambled password that is input from the user interface based on the stored scramble information, and authenticates the user interface by comparing an integrity check code generated from the descrambled password and the stored integrity check code.

16 Claims, 6 Drawing Sheets

US 8,291,491 B2

PASSWORD SYSTEM, METHOD OF GENERATING A PASSWORD, AND METHOD OF CHECKING A PASSWORD

PRIORITY CLAIM

This application claims the benefit of Korean Patent Application No. 10-2008-0020581, filed on Mar. 5, 2008 in the Korean Intellectual Property Office, the disclosure of which is incorporated herein in its entirety by reference.

SUMMARY

The present invention relates to the utilization of passwords to restrict access to a secured system, and more particularly, the present invention relates to a password system, a method of generating a password, and a method of checking the password.

A conventional password system is illustrated in FIG. 1. As shown, the system includes a user interface UI 120 and a secured device 110. An example of the secured device 110 is a network server. The secured device 110 includes a password checking unit CHECK 112 and a memory MEMORY 114. In operation, the password checking unit 112 compares a password PWD that is input from the user interface 120 with a password stored in the memory 114, and, based on a comparison result, determines whether the access via the user interface 120 is authorized or unauthorized.

To enhance security levels, the length of the password can be increased, but this entails increasing the capacity of the memory 114. Sufficient increases in the memory 114 capacity may be costly or impractical in certain situations.

According to an aspect of the present invention, a password system is provided which includes a user interface, a password generating unit, and a password checking unit. The password generating unit generates a password including multiple frames, generates an integrity check code associated with the generated password, and scrambles the generated password and provides the scrambled password to the user interface. The password checking unit stores the integrity check code, frame number information and scramble information which are provided from the password generating unit, descrambles a scrambled password that is input from the user interface based on the stored scramble information, and authenticates the user interface by comparing an integrity check code generated from the descrambled password and the stored integrity check code.

According to another aspect of the present invention, a method of generating a password is provided which includes generating sequential first through N-th ID values and random first through N-th KEY values. The method further includes generating a password by disposing a first frame, which includes the first ID value and the first KEY value, through an N-th frame, which includes the N-th ID value and the N-th KEY value, in a frame part and adding a header part to the frame part. The method still further includes generating an integrity check code with respect to the frame part, scrambling the generated password according to scramble information, and outputting frame number information indicating the number of frames included in the frame part, the integrity check code, the scramble information, and the scrambled password.

According to still another aspect of the present invention, a method of checking a password is provided which includes receiving and storing an integrity check code with respect to a password including a first ID value through an N-th ID value and a first KEY value through an N-th KEY value, frame number information indicating the number of frames included in the password, and scramble information of the password. The method further includes descrambling a scrambled password received from a user interface, based on the scramble information, comparing an integrity check code generated from the descrambled password and the stored integrity check code, respectively comparing a first ID value through an N-th ID value checked from the descrambled password with a first ID value through an N-th ID value generated by an internal ID value generating unit, and comparing a frame number information checked from the descrambled password with the stored frame number information.

BRIEF DESCRIPTION OF THE DRAWINGS

The above and other aspects and features of the present invention will become readily apparent from the detailed description that follows, with reference to the accompanying drawings, in which.

DETAILED DESCRIPTION OF EMBODIMENTS

The present invention will now be described more fully with reference to the accompanying drawings, in which exemplary but non-limiting embodiments of the invention are shown.

Figure 1:
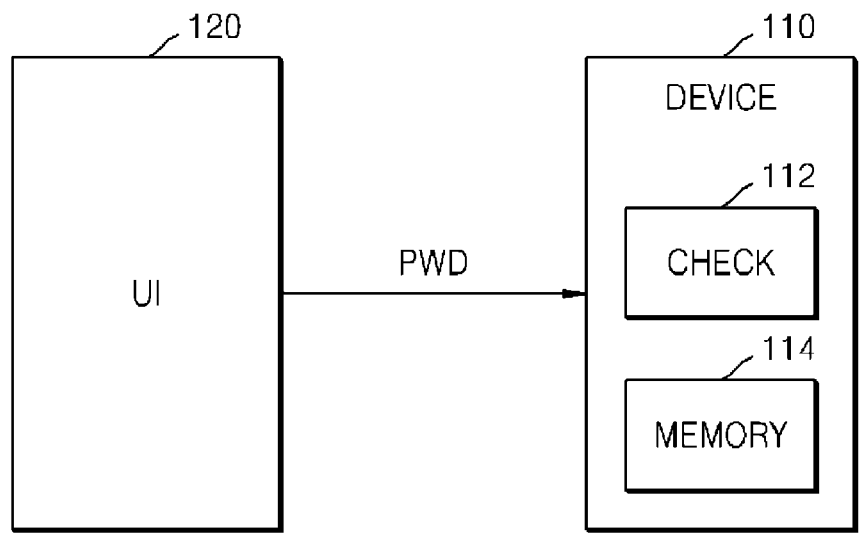
FIG. 1 illustrates a conventional password system.
Figure 2:
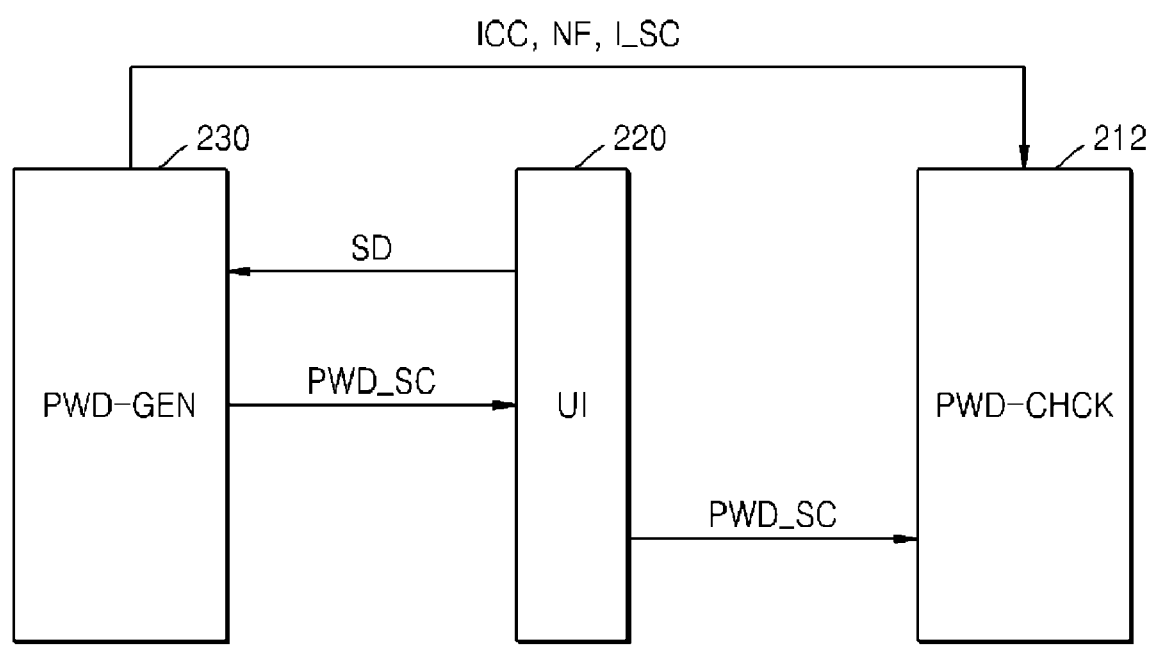
FIG. 2 illustrates a password system according to an embodiment of the present invention.

FIG. 2 illustrates a password system according to an embodiment of the present invention.

Referring to FIG. 2, the password system includes an user interface UI 220, a password generating unit PWD-GEN 230, and a password checking unit PWD-CHK 212. The password generating unit 230 may, for example, be implemented by software, and the password checking unit 212 may, for example, be implemented by hardware. Also, the password checking unit 212 may be included in a device that requires secured access, such a network server or computer system.

The user interface 220 provides a password seed value SD to the password generating unit 230, and the password generating unit 230 generates a password based on the password seed value SD. It is noted, however, that the password seed value is not necessarily required to generate a password, i.e., the password generating unit 230 may also generate a password when no password seed value SD is provided.

The password generating unit 230 generates a password including multiple frames, which will be described in detail later with reference to FIG. 3, generates an integrity check code ICC with respect to the generated password, scrambles the generated password, and provides the scrambled password PWD_SC to the user interface 220.

The password checking unit 212 stores the integrity check code ICC, frame number information NF, and scramble information I_SC, which are provided from the password generating unit 230, descrambles a scrambled password PWD_SC which is input from the user interface 220, and compares an integrity check code ICC that is generated from the descrambled password and the stored integrity check code ICC to authenticate access via the user interface 220.

The password system of FIG. 2 will be described in greater detail below with reference to FIGS. 3 through 7.

Figure 3:
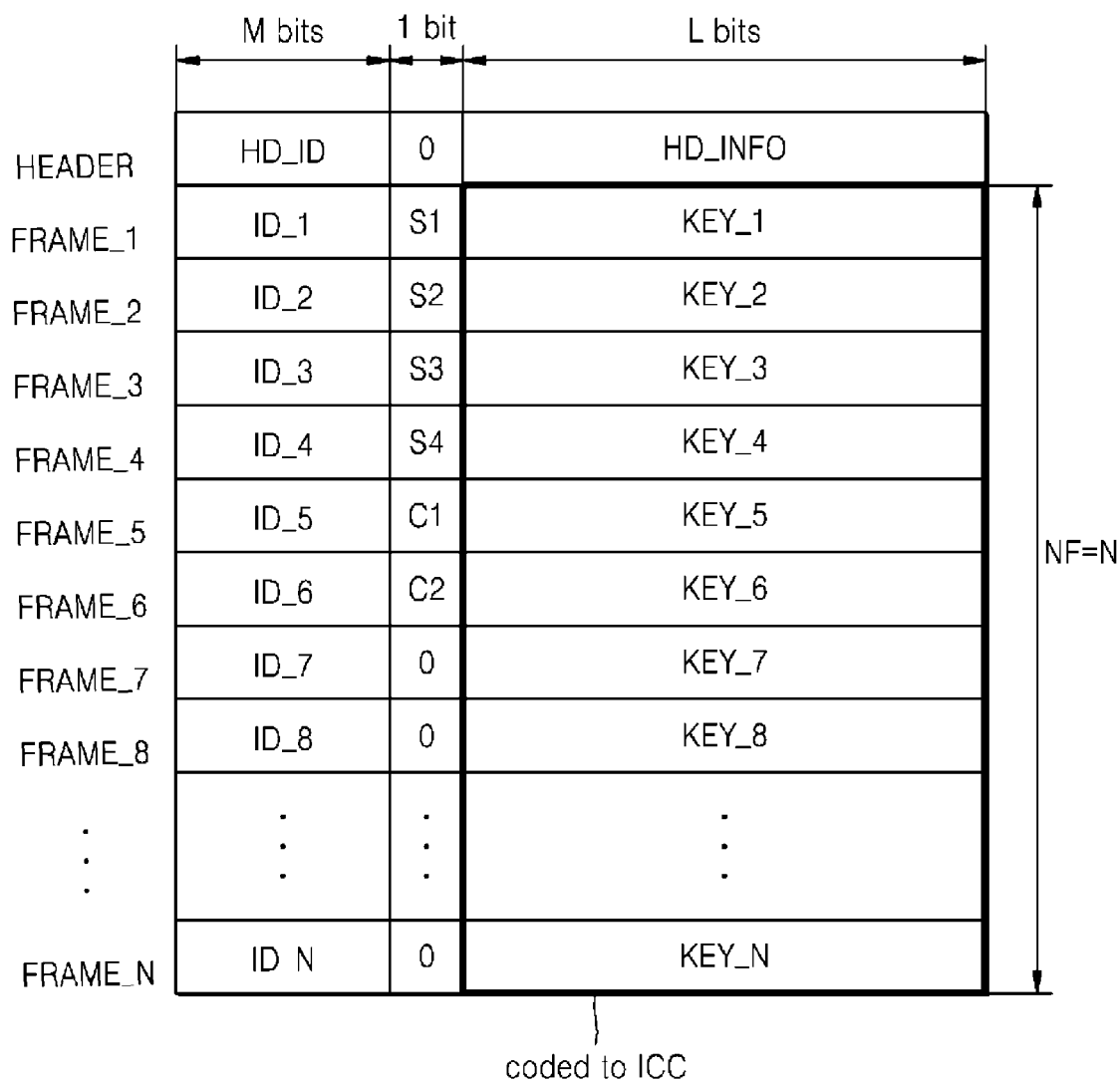
FIG. 3 illustrates the format of a password utilized in a password system according to an embodiment of the present invention.

FIG. 3 illustrates an example of the format of a password utilized in a password system according to an embodiment of the present invention.

The password illustrated in FIG. 3 includes a header part HEADER and frame parts FRAME_1-FRAME_N. The header part HEADER includes an ID header HD_ID, and other information HD_INFO such as the version of the password. As illustrated in FIG. 3, the frame part includes a first frame FRAME_1 including a first ID value ID_1 and a first KEY value KEY_1 through an N-th frame FRAME_N including an N-th ID value ID_N and an N-th KEY value KEY_N.

Also, the frame parts FRAME_1-FRAME_N include user mode values S1, S2, S3, and S4 and mode check codes C1 and C2. The user mode values S1, S2, S3, and S4 denote an access right of the user interface 220. For example, the user mode value may represent whether the user, who is trying to gain access through the user interface, is a normal user or a manager. The manager may have greater access rights as compared to a normal user. In order to prevent the user mode values S1, S2, S3, and S4 from being changed unintentionally, the mode check codes C1 and C2 with respect to the user mode values S1, S2, S3, and S4 are further added to the frame parts FRAME_1-FRAME_N.

In FIG. 3, first through fourth frames FRAME_1, FRAME_2, FRAME_3, and FRAME_4 include ID values ID_1, ID_2, ID_3, and ID_4, user mode values S1, S2, S3, and S4, and KEY values KEY_1, KEY_2, KEY_3, and KEY_4. Fifth and sixth frames FRAME_5 and FRAME_6 each include ID values ID_5 and ID_6, mode check codes C1 and C2, and KEY values KEY_5 and KEY_6. A seventh frame through an N-th frame FRAME_7, FRAME_8, ... through FRAME_N each include ID values ID_7, ID_8, ... through ID_N, zero (0), and KEY values KEY_7, KEY_8, through KEY_N. It should be understood, however, the embodiment illustrated in FIG. 3 is simply an example, and variations may be made, for example, as to which frame includes the user mode value, and whether it includes a mode check code or simply zero. Also, in FIG. 3, ID values ID_1-ID_N are M-bits, the user mode values S1, S2, S3, S4 and the mode check codes C1 and C2 are 1-bit, respectively, and the KEY values KEY_1-KEY_N are L-bits, but the number of bits the ID values, the user mode values, the mode check codes, and the KEY values each occupy, may be varied.

In the current embodiment of the present invention, the number of frames included in the password is variable. For example, a password that is generated in the password generating unit 230 may include (N−3) frames, and another password may include N frames, and a still another password may include (N+5) frames. Frame number information NF according to the password system of the present invention indicates the number of frames included in the password. The password illustrated in FIG. 3 includes N frames FRAME_1-FRAME_N, and accordingly, frame number information NF of FIG. 3 is N.

When the number of frames included in the password varies, the security level is higher than the security level when the number of frames included in the password is uniform. Accordingly, by varying the number of frames included in the password, the protection against attacks by unauthorized users can be improved.

Frame number information NF is checked by the password checking unit 212. That is, the password checking unit 212 of FIG. 2 descrambles the scrambled password PWD_SC that is received from the user interface 220 based on the stored scramble information I_SC, and compares frame number information NF that is checked in the descrambled password with the stored frame number information NF, and authenticates the user interface 220 if the two items of information agree with each other.

In FIG. 3, the first ID value ID_1 through the N-th ID value ID_N are sequential. Here, 'sequential' means that the order of the first ID value ID_1, the second ID value ID_2, the third ID value ID_3, the fourth ID value ID_4, the fifth ID value ID_5, the sixth ID value ID_6, the seventh ID value ID_7, the eighth ID value ID_8, through the N-th ID value ID_N must be maintained. In a decimal system, the order of 0, 1, 2, 3, 4, 5, 6, 7, 8, 9 is already fixed, and in a hexadecimal system, the order of 0, 1, 2, 3, 4, 5, 6, 7, 8, 9, A, B, C, D, E, F is already fixed. However, the decimal system and the hexadecimal system are open number systems, and thus which number comes after a certain number can be predicted.

Since it is not preferable that the order of numbers can be predicted in terms of cryptology, in the password system according to the current embodiment of the present invention, ID values whose order cannot be predicted are used. For example, if a first ID value ID_1 is "00101100", a second ID value ID_2 is "01001101", and a third ID value is ID_3 "11110101", and even when the first ID value "00101100" and the second ID value "01001101" are found out by chance, the third ID value cannot be predicted. Thus, the ID values described above are unpredictable. Also, the ID values are sequential in that once the order is given, the order of the first ID value "00101100", the second ID value "01001101", and the third ID value "11110101" must be maintained.

The ID value generating unit generating unpredictable and sequential ID values as described above is respectively included in the password generating unit 230 and the password checking unit 212. According to another embodiment of the present invention, a linear feedback shift register (LFSR) may be used as an ID value generating unit. Hereinafter, the LFSR will be described in detail with reference to FIGS. 4A and 4B.

Figure 4A:
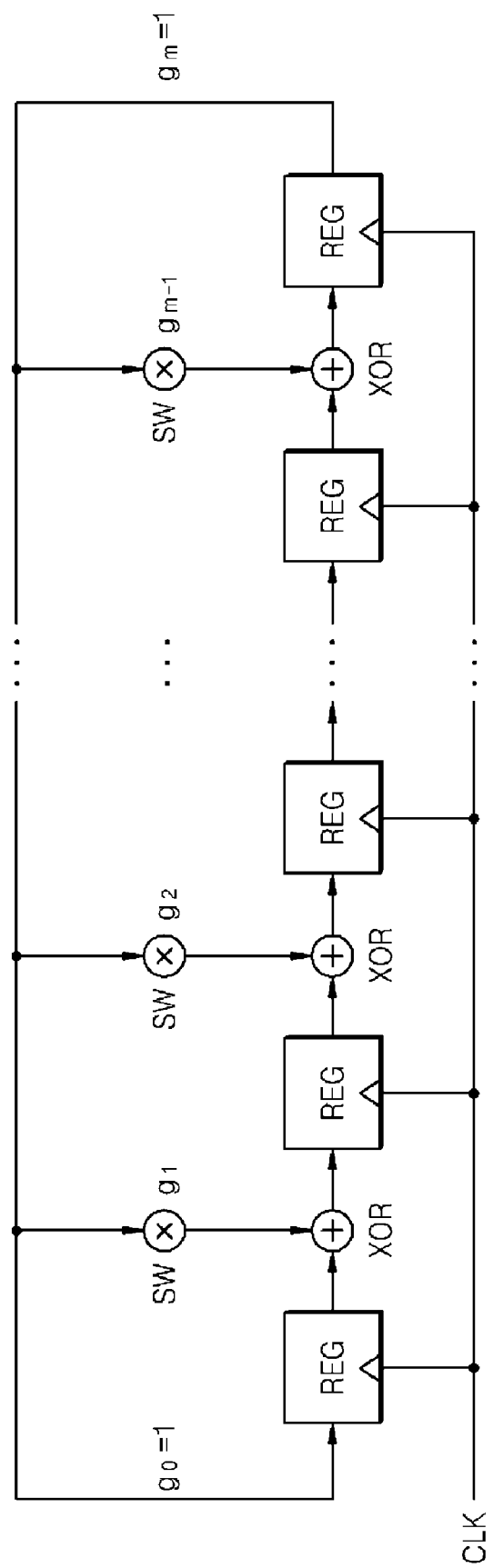
FIG. 4A illustrates a general linear feedback shift register (LFSR) utilized as an ID value generator according to an embodiment of the present invention.
Figure 4B:
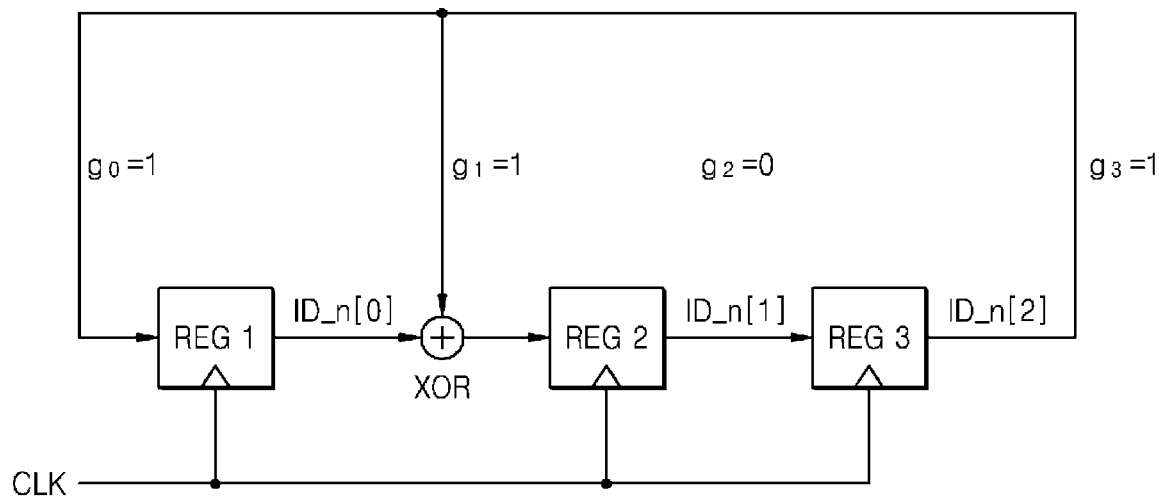
FIG. 4B illustrates a specific linear feedback shift register (LFSR) utilized as an ID value generator according to an embodiment of the present invention.

FIG. 4A illustrates an LFSR that can be used as an ID value generating unit, and FIG. 4B illustrates the LFSR in detail.

The LFSR includes multiple registers REG, multiple exclusive Ors XOR, and multiple switches SW. The LFSR of FIG. 4A can realize LFSR a polynomial expression G(X) expressed using Equation 1 below.

$$G(X) = g_0 X^0 + g_1 X^1 + g_2 X^2 + g_3 X^3 + \ldots + g_{m-1} X^{m-1} + g_m X^m \quad \text{Equation 1}$$
$$= 1 + g_1 X^1 + g_2 X^2 + g_3 X^3 + \ldots + g_{m-1} X^{m-1} + X^m$$

In the LFSR polynomial expression G(X), each of coefficients $g_0$, $g_1$, $g_2$, through to $g_{m-1}$, and $g_m$ represents connection or blocking of feedback paths corresponding to the switches SW. If a coefficient is 1, a feedback path is connected, and if a coefficient is 0, a feedback path is blocked. The coefficient $g_0$ of the lowest order and the coefficient $g_m$ of the highest order are always 1. Each of the registers REGs updates storage values at edges of clock signals CLK. The coefficients of the LFSR represent coefficients $g_0$, $g_1$, $g_2$, through to $g_{m-1}$, and $g_m$ of the LFSR polynomial expression G(X), and the initial values of the LFSR represent initial storage values of the REGs. The LFSR outputs unpredictable and sequential values according to the set coefficients and initial values. FIG. 4B illustrates a specific example of an LFSR that realizes an LFSR polynomial expression expressed as in Equation 2 below.

$$G(X) = g_0 X^0 + g_1 X^1 + g_2 X^2 + g_3 X^3 \quad \text{Equation 2}$$
$$= 1 + X^1 + X^3$$
$$(g_0 = 1, g_1 = 1, g_2 = 0, g_3 = 1)$$

In Equation 2, since a coefficient $g_2$ of the second order is zero, a feedback path corresponding to the coefficient $g_2$ is blocked. When the feedback path is blocked, the XOR becomes meaningless, that is, the calculation result of the output of a register REG2 and 0 from the blocked feedback path is always the same as the output of the register REG2, and thus it can be regarded that the output of the register REG2 is used as an input of register REG3. In the meantime, if the LFSR illustrated in FIG. 4B is a serial output type, a one-bit output from the register REG3 at each edge of a clock signal CLK corresponds to a one-bit output of the LFSR. If the LFSR illustrated in FIG. 4B is a parallel output type, a one-bit value ID_n[0] output from a register REG1 at each edge of a clock signal CLK, a one-bit value ID_n[1] output from the register REG2, and a one-bit value ID_n[2] output from a register REG3 correspond to a three-bit output of the LFSR.

The size of the LFSR denotes the number of registers that are included in the LFSR. The LFSR, which is a parallel output type and has a size M, outputs an M-bit output at each edge of the clock signal CLK. When the initial storage values of the register REG are all set to zero, the M-bit output, of which all bits are zero, is output, and thus at least one of the initial storage values of the register REG is set as 1. Then, $(2^M-1)$ different M-bit outputs are sequentially output from the LFSR. In the LFSR, the remaining M-bit binary numbers among $2^M$ different M-bit binary numbers except for the M-bit binary numbers whose bits are all zero are used as an M-bit output of the LFSR. In this respect, the bit efficiency can be regarded as being very high.

The first M-bit output from the LFSR is made to correspond to a first ID value ID_1 of FIG. 3, the second M-bit output is made to correspond to a second ID value ID_2, and a third M-bit output is made to correspond to a third ID value ID_3 of FIG. 3. When the M-bit outputs are made to respectively correspond to ID values, unpredictable and sequential ID values can be obtained. When a serial output type LFSR is used, a first 1-bit output through to an M-th 1-bit output, which are output from the LFSR, can be made to correspond to the first ID value ID_1 of FIG. 3.

Since the LFSR has a circulation characteristic, after a first M-bit output through to a $(2^M-1)$-th M-bit output are sequentially output, an output identical to the first M-bit output is output again as a $2^M$th M-bit output. That is, a $2^M$th M-bit output through to a $[2*(2^M-1)]$-th M-bit output respectively correspond to the first M-bit output through to the $(2^M-1)$-th M-bit output. If the number of frames N included in the password in FIG. 3 is greater than $(2^M-1)$, for example, when N is 16 and M is 3, an eighth 3-bit output (corresponding to ID_8) of the LFSR is identical to the first 3-bit output (corresponding to ID_1), a ninth 3-bit output (corresponding to ID_9) is identical to the second 3-bit output (corresponding to ID_2), and a tenth 3-bit output (corresponding to ID_10) is identical to the third 3-bit output (corresponding to ID_3).

When the initial values or coefficients of the LFSR vary, the order of $(2^M-1)$ different M-bit outputs output from the LFSR also varies. Accordingly, when different initial values or different coefficients are set corresponding to each of passwords in the LFSR, a first ID value ID_1 through an N-th ID value ID_N can be obtained for each of the passwords. The order of $(2^M-1)$ different M-bit outputs, that is, the order of $(2^M-1)$ different M-bit binary numbers, is different for each of the passwords.

In FIG. 2, the password generating unit 230 includes a first LFSR, and the password checking unit 212 includes a second LFSR that shares initial values and coefficients with the first LFSR. Here, the fact that the first LFSR and the second LFSR share initial values and coefficients means that the first LFSR and the second LFSR have the same initial values and identical coefficients. The identical initial values and the identical coefficients vary corresponding to each of the passwords. Since initial values and coefficients are shared, a first ID value ID_1 through an N-th ID value ID_N which are output from the first LFSR and first ID value ID_1 through an N-th ID value ID_N which are output from the second LFSR are identical to each other, and so are the orders of the values of the two groups.

The ID values ID_1-ID_N are inspected by the password checking unit 212. That is, the password checking unit 212 descrambles the scrambled password PWD_SC that is received from the user interface 220 based on stored scramble information I_SC, and respectively compares a first ID value ID_1 through an N-th ID value ID_N that are checked in the descrambled password and a first ID value ID_1 through an N-th ID value ID_N that are generated by the second LFSR inside the password checking unit 212, and authenticates the user interface 220 when the two groups of the ID values are identical to each other.

A first KEY value KEY_1 through an N-th KEY value KEY_N included in the frame part FRAME_1-FRAME_N in FIG. 3 are randomly generated using a random number generator (RNG). Since the first KEY value KEY_1 through N-th KEY value KEY_N are randomly generated using an RNG, they are also unpredictable.

In FIG. 3, an integrity check code ICC is a code for checking integrity with respect to the first KEY value KEY_1 through the N-th KEY value KEY_N included in the frame part FRAME_1-FRAME_N. An integrity check code ICC with respect to the first KEY value KEY_1 through the N-th KEY value KEY_N can be generated, for example, by using a cyclic redundancy check (CRC) method, a HASH method, or a Check Sum method. In the CRC method, a 32-bit integrity check code ICC or a 64-bit integrity check code ICC with respect to the first KEY value KEY_1 through the N-th KEY value KEY_N can be generated. In the HASH method, a 160-bit integrity check code ICC or 256-bit integrity check code ICC with respect to the first KEY value KEY_1 through the N-th KEY value KEY_N can be generated. A description of the methods such as the CRC method, the HASH method, or the Check Sum method will be omitted since these methods are well known to those of ordinary skill in the art. In FIG. 3, an ICC with respect to the KEY values KEY_1-KEY_N being generated is illustrated. However, not only an ICC with respect to the KEY values KEY_1 through KEY_N, but also an ICC with respect to the KEY values KEY_1-KEY_N and also the ID values ID_1-ID_N may be generated.

Figure 5:
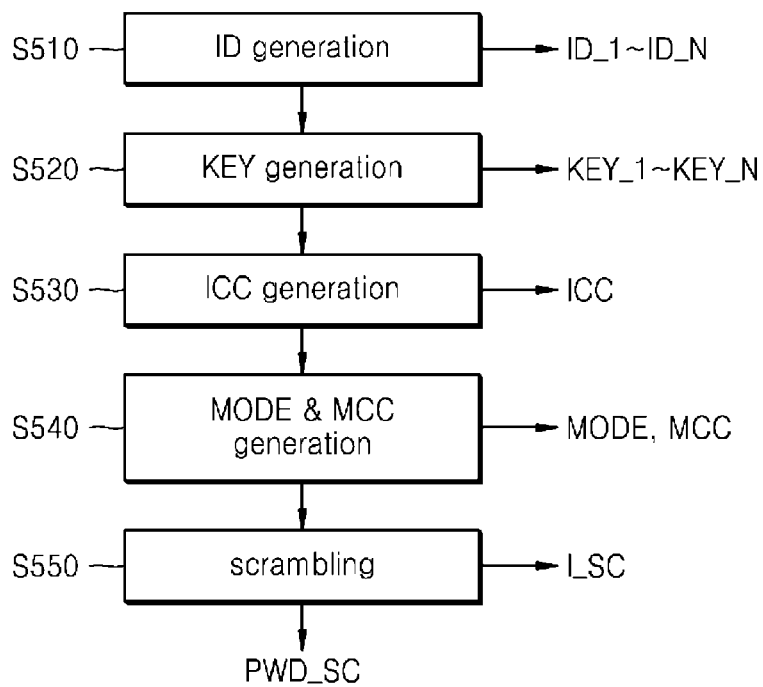
FIG. 5 is a flowchart for use in describing a method of generating a password according to an embodiment of the present invention.

FIG. 5 is a flowchart for use in describing a method of generating a password according to an embodiment of the present invention. The method illustrated in FIG. 5 may also be performed in the password generating unit 230 of FIG. 2.

In operation S510, sequential, first ID value ID_1 through N-th ID value ID_N values are generated. As described above, the first ID values ID_1 through N-th ID values ID_N may be generated by the first LSFR included in the password generating unit 230. In operation S520, random first KEY value KEY_1 through N-th KEY value KEY_N are generated. The first KEY value KEY_1 through N-th KEY value KEY_N may be randomly generated using an RNG. In operation S530, an ICC with respect to the first KEY value KEY_1 through the N-th KEY value KEY_N is generated using a CRC method, a HASH method, a Check Sum method, or so forth.

The ID values ID_1-ID_N generated in operation S510 and the KEY values KEY_1-KEY_N generated in operation S520 are disposed in frame parts FRAME_1-FRAME_N. That is, a first frame FRAME_1 including a first ID value ID_1 and a first KEY value KEY_1 through an N-th frame FRAME_N including an N-th ID value ID_N and an N-th KEY value KEY_N are disposed in the frame part. As described above, the number of frames included in the frame parts FRAME_1-FRAME_N is variable. That is, the number of frames included in the frame parts FRAME_1-FRAME_N may vary according to each password.

As illustrated in FIG. 3, the frame parts FRAME_1-FRAME_N may further include user mode values MODE, S1, S2, S3, and S4 in FIG. 3 representing an access right of the user interface 220 and mode check codes MCC, C1 and C2 in FIG. 3, with respect to the user mode values MODE in addition to the ID values ID_1 to ID_N and the KEY values KEY_1 to KEY_N. The user mode values MODE and the mode check codes MCC are generated in operation S540 in FIG. 5. A password is finally formed by adding a header part HEADER to the frame parts FRAME_1 to FRAME_N.

In operation S550, the completely formed password is scrambled according to scramble information I_SC. For example, the header part HEADER and the frame parts FRAME_1-FRAME_N are scrambled in units of rows and/or columns to generate a scrambled password PWD_SC. The password generating unit 230 outputs frame number information NF indicating the number of frames included in the frame parts FRAME_1 to FRAME_N, the integrity check code ICC, and the scramble information I_SC, and provides the scrambled password PWD_SC to the user interface 220.

Figure 6:
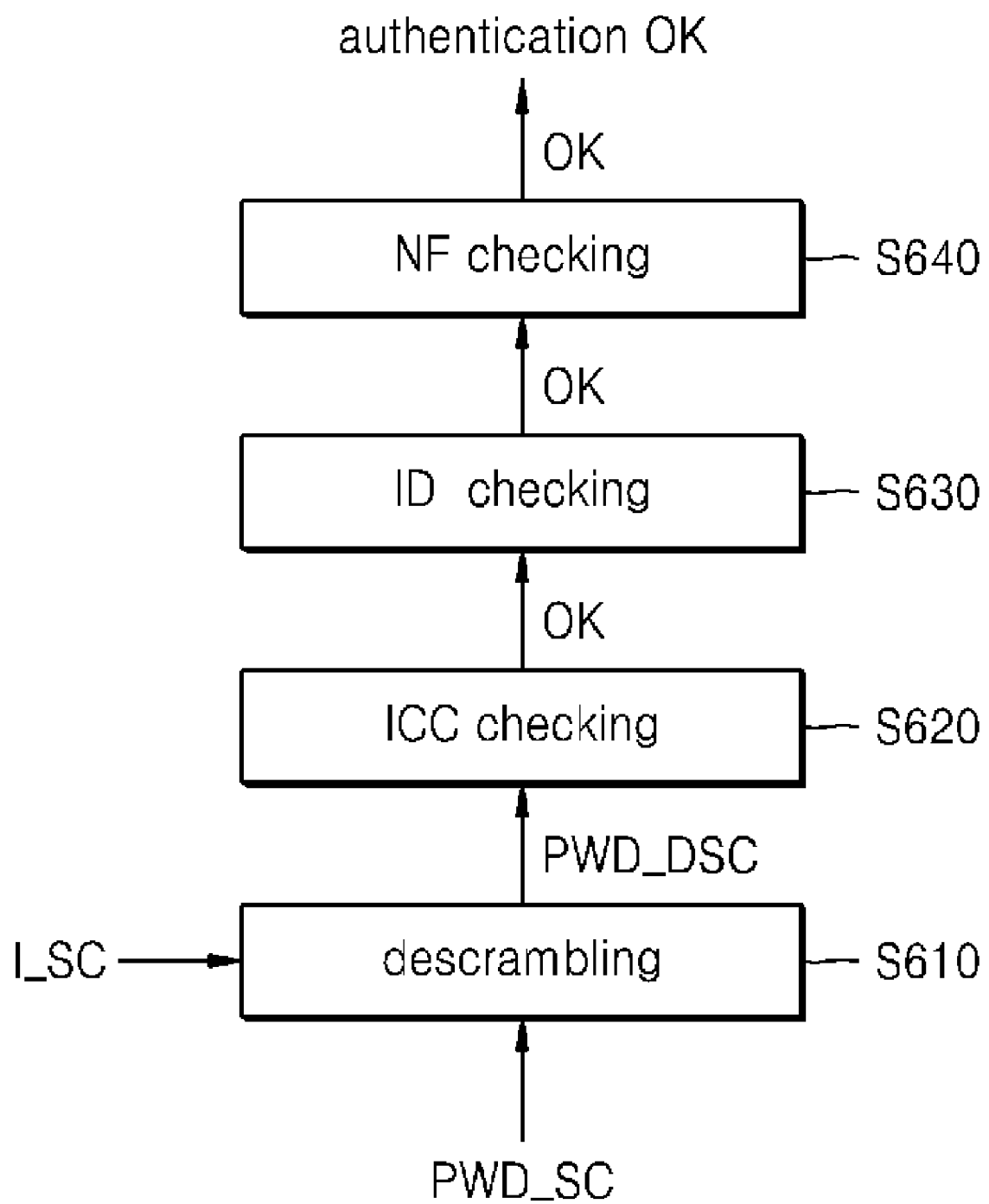
FIG. 6 is a flowchart for use in describing a method of checking a password according to an embodiment of the present invention.
Figure 7:
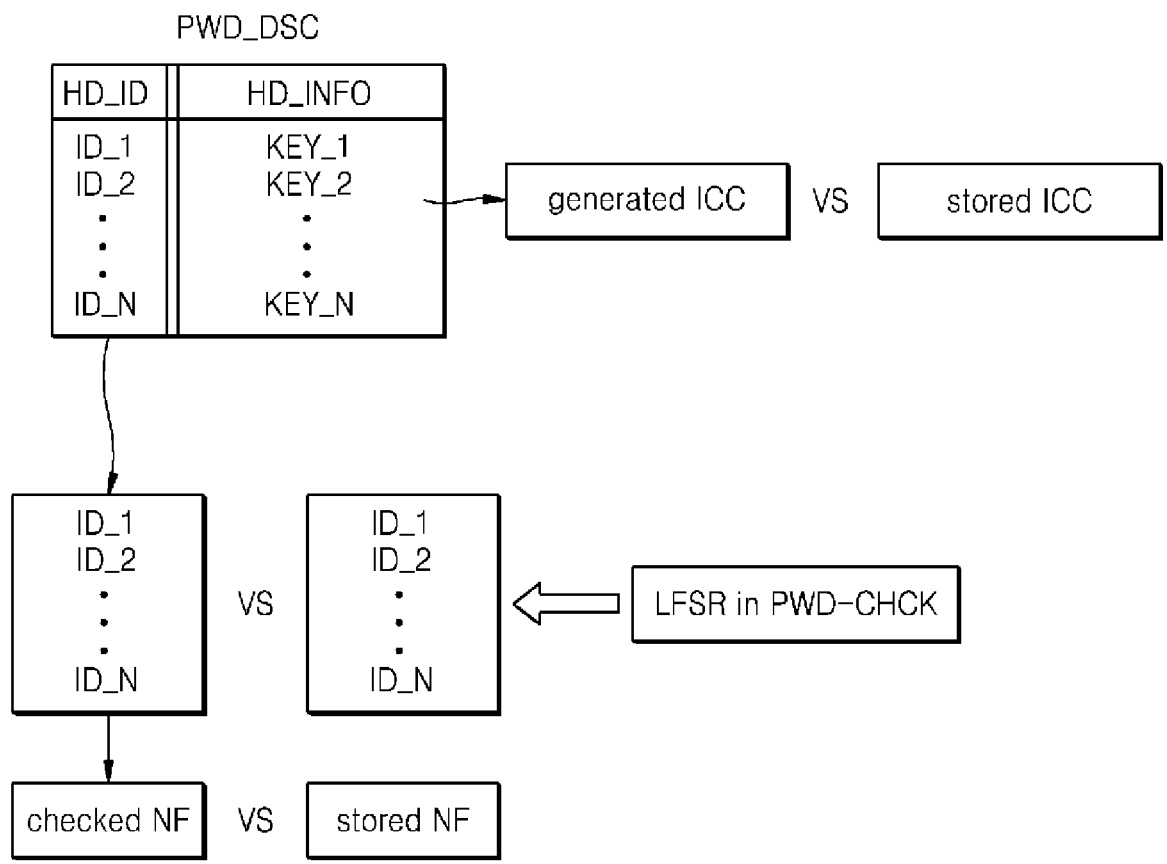
FIG. 7 is a schematic diagram for use in explaining the method associated with FIG. 6 according to an embodiment of the present invention.

FIG. 6 is a flowchart and FIG. 7 is a schematic diagram for use in describing a method of checking a password according to an embodiment of the present invention. The method of checking a password illustrated in FIGS. 6 and 7 may be performed by the password checking unit 212.

The password checking unit 212 stores the frame number information NF, the integrity check code ICC, and the scramble information I_SC which are received from the password generating unit 230.

In operation S610, the scrambled password PWD_SC that is received from the user interface 220 is descrambled based on stored scramble information I_SC. In operation S620, an integrity check code ICC ("generated ICC" in FIG. 7) generated from the descrambled password (PWD_DSC in FIGS. 6 and 7) and stored integrity check code ("stored ICC" in FIG. 7) are compared. As described above, the ICC is an integrity check code with respect to the frame parts FRAME_1 to FRAME_N in FIG. 3, for example, an integrity check code ICC for checking integrity with respect to the first KEY value KEY_1 through the N-th KEY value KEY_N. In operation S630, the first ID value ID_1 through the N-th ID value ID_N checked from the descrambled password PWD_DSC and the first ID value ID_1 through the N-th ID value ID_N generated from the second LFSR inside the password checking unit 212 (LFSR in PWD-CHCK) are respectively compared. In operation S640, frame number information ("checked NF" in FIG. 7) checked in the descrambled password PWD_DSC and the stored frame number information ("stored NF" in FIG. 7) are compared. The order of operations S620, S630, and S640 may be changed.

In regard to each of the comparison results of operations S620, S630, and S640, when the integrity check code ICC generated from the descrambled password PWD_DSC ("generated ICC") and the stored integrity check code ICC are identical to each other, and when the first ID value ID_1 through the N-th ID value ID_N checked in the descrambled PWD_DSC and the first ID value ID_1 through N-th ID value ID_N generated from the second LFSR in PWD-CHCK are identical to each other, and when the frame number information checked in the descrambled password PWD_DSC ("checked NF") and the stored frame number information ("stored NF") are identical to each other, the user interface 220 is authenticated. When the user interface 220 is authenticated, the user is allowed to access the secured device.

The password according to the current embodiment of the present invention may further include a user mode value MODE which represents an access right of the user interface 220 and a mode check code MCC with respect to the user mode value MODE in addition to the first ID value ID_1 through the N-th ID value ID_N and the first KEY value KEY_1 through the N-th KEY value KEY_N as illustrated in FIG. 3. In this case, the user interface 220, which is authenticated by performing operations S620, S630, and S640, can change the user mode value MODE by additionally undergoing a certain inspection. For example, the authenticated user interface 220 undergoes a certain inspection to adjust the security level, thus changing the original level of security from that associated with a simple user to that associated with manager.

According to the current embodiment of the present invention, the password checking unit 212 does not store the password itself, but instead stores frame number information NF, the integrity ICC, and the scrambled information I_SC. In other words, the frame number information NF, the integrity check code ICC, and the scramble information I_SC are stored instead of the password including the ID values, the KEY values, the user mode value MODE, and the mode check code MCC. Consequently, even when extending the length of the password to increase the security level, the memory capacity of the password checking unit 212 does not have to be increased. Instead of directly comparing the KEY values KEY_1 through KEY_N, integrity check codes ICC with respect to the KEY values KEY_1 through KEY_N are compared, and thus the KEY values KEY_1 through KEY_N do not have to be stored in the memory of the password checking unit 212. The ID values ID_1 to ID_N checked in the descrambled password and the ID values ID_1 to ID_N generated from the second LFSR are respectively compared, and thus the ID values ID_1 to ID_N do not have to be stored in the memory of the password checking unit 212.

Also, since the ID values ID_1 to ID_N are generated using an LFSR instead of an adder and a read-only memory table (ROM table) for storing an open numerical system, the surface area for hardware implementation can be reduced.

The comparing of only integrity check code ICC with respect to the password, instead of comparing the password directly, may be vulnerable to cryptological collision. In order to compensate for this, according to embodiments of the present invention, checking of the integrity check code, checking of the sequential ID value, checking of the variable frame numbers, and scrambling, are performed together to efficiently increase the security level of the password system.

The method of checking a password used in the password system according to the present invention can be applied to a secure joint test action group (JTAG) system for debugging. JTAG refers to a standard that is designated for testing a printed circuit board (PCB) and other devices. The user connects a JTAG emulator to an IC through a JTAG port to test whether the IC is properly operated based on the data input and output between the JTAG emulator and the IC. In the case of an IC requiring security, the access of the user should be restricted, and thus the method of checking a password according to the present invention can be applied to the secure JTAG system. In addition, the password system, the method of generating a password, and the method of checking the password according to embodiments of the present invention can be applied to any device, network server, or application system requiring security utilizing hardware and/or software.

According to the present invention, attacks by unauthorized users can be efficiently prevented without the necessity of increasing memory capacity.

In addition, by checking the integrity check code, sequential ID values, variable numbers of frames, and scrambling together, the security level of the password system can be efficiently improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A password system comprising:
   a user interface;
   a password generating unit which generates a password including multiple frames, which generates an integrity check code associated with the generated password, and which scrambles the generated password and provides the scrambled password to the user interface; and
   a password checking unit which stores the integrity check code, frame number information and scramble information which are provided from the password generating unit, which descrambles a scrambled password that is input from the user interface based on the stored scramble information, and which authenticates the user interface by comparing an integrity check code generated from the descrambled password and the stored integrity check code.

2. The password system of claim 1, wherein the number of frames included in the password generated by the password generating unit is variable.

3. The password system of claim 2, wherein the frame number information indicates the number of frames included in the password.

4. The password system of claim 2, wherein the password checking unit authenticates the user interface by comparing a frame number information checked from the descrambled password and the stored frame number information.

5. The password system of claim 1, wherein the password generated by the password generating unit includes a header part and a frame part, and
   wherein the frame part includes first through N-th frames, and each n-th frame includes an n-th ID value and an n-th KEY value,
   wherein N is a natural number and n is a natural number from 1 to N.

6. The password system of claim 5, wherein the first through N-th ID values included in the respective first through N-th frames are sequential.

7. The password system of claim 6, wherein the password generating unit comprises a first linear feedback shift register (LFSR) that sequentially generates the first through N-th ID values.

8. The password system of claim 7, wherein initial values or coefficients of the first LFSR are different for each password, and the first LFSR generates first through N-th ID values that are different for each password.

9. The password system of claim 7, wherein the password checking unit comprises a second LFSR that shares initial values and coefficients with the first LFSR included in the password generating unit.

10. The password system of claim 9, wherein the password checking unit authenticates the user interface by respectively comparing a first ID value through an N-th ID value which are checked from the descrambled password with a first ID value through an N-th ID value generated in the second LFSR.

11. The password system of claim 5, wherein the first frame through the N-th frame further include:
   a user mode value representing an access right of the user interface; and
   a mode check code regarding the user mode value.

12. The password system of claim 11, wherein the user interface that is authenticated in the password checking unit, is permitted to change the user mode value.

13. The password system of claim 5, wherein a first KEY value through an N-th KEY value included in the frame part, are randomly generated using a random number generator (RNG).

14. The password system of claim 5, wherein the integrity check code checks the integrity with respect to a first KEY value through an N-th KEY value included in the frame part.

15. The password system of claim 1, wherein the integrity check code is generated using one of a cyclic redundancy check (CRC) method, a HASH method, and a Check Sum method.

16. The password system of claim 1, wherein the user interface provides a password seed value to the password generating unit, and the password generating unit generates the password based on the password seed value.

* * * * *